United States Patent
Chau et al.

(10) Patent No.: US 7,402,955 B2
(45) Date of Patent: Jul. 22, 2008

(54) LAMP WITH MULTI-LAYER PHOSPHOR COATING

(75) Inventors: Chung-nin Chau, Athens, PA (US); Paul W. Salvi, Versailles, KY (US); Roger B. Hunt, Jr., Medfield, MA (US)

(73) Assignee: Osram Sylvania Inc., Danvers, MA (US)

( * ) Notice: Subject to any disclaimer, the term of this patent is extended or adjusted under 35 U.S.C. 154(b) by 679 days.

(21) Appl. No.: 10/908,726

(22) Filed: May 24, 2005

(65) Prior Publication Data
US 2006/0267500 A1    Nov. 30, 2006

(51) Int. Cl.
*H01J 17/04*    (2006.01)
*H01J 61/04*    (2006.01)

(52) U.S. Cl. ........... 313/634; 313/485; 313/493; 252/301.4 R

(58) Field of Classification Search ............ 313/634, 313/493, 487, 485, 486, 489, 635, 637, 639; 252/301.4 F, 301.4 R
See application file for complete search history.

(56) References Cited

U.S. PATENT DOCUMENTS

| | | | |
|---|---|---|---|
| 4,079,288 A | 3/1978 | Maloney et al. ............. | 313/489 |
| 4,088,923 A | 5/1978 | Manders .................... | 313/487 |
| 4,305,019 A | 12/1981 | Graff et al. ................. | 313/487 |
| 4,431,941 A | 2/1984 | Roy et al. ................... | 313/487 |
| 4,623,816 A | 11/1986 | Hoffman et al. ............ | 313/487 |
| 4,806,824 A | 2/1989 | Paynter et al. .............. | 313/486 |
| 4,879,492 A | 11/1989 | Latassa et al. .............. | 313/485 |
| 4,924,141 A | 5/1990 | Taubner et al. ............. | 313/488 |
| 5,008,789 A | 4/1991 | Arai et al. .................. | 362/255 |
| 5,726,528 A | 3/1998 | Jansma et al. .............. | 313/489 |

*Primary Examiner*—Joseph L Williams
(74) *Attorney, Agent, or Firm*—Robert F. Clark

(57) ABSTRACT

A lamp envelope is provided with an alumina layer and a multilayer phosphor coating on the alumina layer. The phosphor coating includes a top phosphor layer with a first weight percent of rare earth activators and a middle phosphor layer with a second weight percent of rare earth activators. The second weight percent is less than the first weight percent so that a total amount of the activators in the coating is reduced while maintaining a required lamp brightness and color rendering index (CRI). Preferably, the second weight percent is about 50-60% of the first weight percent and the middle layer is about 30-50% of a total weight of the coating so that a total weight of the activators in the coating is no more than about 80% of a weight of the activators in the coating if the first and second weight percents were the same.

19 Claims, 4 Drawing Sheets

LAMP WITH MULTI-LAYER PHOSPHOR COATING

BACKGROUND OF THE INVENTION

The present invention is directed to a lamp that has a phosphor coating and more particularly to a fluorescent lamp having a phosphor coating on an alumina layer.

Some lamps, notably fluorescent lamps, use a coating of phosphors on the interior surface of the lamp envelope that converts ultraviolet radiation to visible light suitable for the intended purpose. Many of these phosphors are activated by rare earth ions. The coatings are typically blends that include amounts of particular phosphors and their respective rare earth activators that achieve the desired lamp brightness and color rendering index (CRI). For example, the CRI of some fluorescent lamps is desirably in excess of 82 and the 100 hour brightness is at least 3000 lumens.

Examples of the phosphors used in fluorescent lamps include one or more of a europium-activated yttrium oxide (YOE, $Y_2O_3$:Eu) red phosphor with a primary emission at 612 nm, a cerium and terbium-activated lanthanum phosphate (LAP, $(La,Ce,Tb)PO_4$) green phosphor with a primary emission at 544 nm, a europium-activated barium magnesium aluminate (BAM, $BaMgAl_{10}O_{17}$:Eu) blue phosphor with a primary emission at 455 nm, and a europium-activated strontium borophosphate (SBP, $Sr_6P_5BO_{20}$:Eu) blue-green phosphor with a primary emission at 480 nm. The specific rare earth activators for these phosphors include europium, terbium and cerium.

The cost of the rare earth activators is relatively high and various attempts have been made to reduce their use. In fluorescent lamps, the amount of ultraviolet radiation converted to visible light by the phosphor coating is a function of coating thickness, activator levels, and phosphor particle reflectivity. One attempt to reduce the cost of the rare earth activators in a lamp was to reduce a thickness of the coating, thereby reducing the amount of rare earth activators in the lamp. However, as the thickness of the coating was reduced more of the ultraviolet radiation passed through the coating and did not produce visible light.

To compensate for this loss of visible light, a less expensive halophosphate phosphor layer was placed under the coating (between the envelope interior surface and the coating) to convert the ultraviolet radiation that passed through the coating to visible light. However, the quality of the light emitted by the lamp was reduced due to the broad band emission spectra and low quantum efficiency of halophosphate phosphors. Specifically, the halophosphate phosphor layer reduced the lamp CRI to unacceptable levels. In addition, the halophosphate phosphor layer did not maintain consistent light output over the life of the lamp resulting in poor lamp lumen maintenance.

In a further attempt to reduce the amount of rare earth activators, the thickness of the phosphor coating was reduced and a layer of alumina was added between the phosphor coating and the lamp interior surface (instead of the halophosphate phosphor layer). The alumina layer provided some ultraviolet reflectivity so that some of the ultraviolet radiation that passed through the coating was reflected back into the phosphor coating for conversion to visible light. The alumina layer included mixed phase alumina particles that reflected the unused ultraviolet radiation back into the phosphor coating to provide higher ultraviolet conversion at lower coating weights. Nevertheless, the phosphor coating on the alumina layer still had to be relatively thick in order to achieve the desired lamp brightness.

SUMMARY OF THE INVENTION

Accordingly, an object of the present invention is to provide a novel lamp that contains a smaller amount of rare earth activators and that avoids the problems of the prior art.

A further object of the present invention is to provide a novel lamp that includes a laminate on an interior surface of the lamp envelope, where the laminate includes an alumina layer and a multilayer phosphor coating on the alumina layer. The phosphor coating includes a top layer with a first weight percent of rare earth activators and a middle layer with a second weight percent of the rare earth activators, where the second weight percent is less than the first weight percent so that a total amount of the rare earth activators in the coating is reduced while maintaining a required lamp brightness and color rendering index (CRI).

A yet further object of the present invention is to provide a novel lamp where the second weight percent is about 50-60% of the first weight percent of the rare earth activators and the middle layer is about 30-50% of a total weight of the phosphor coating so that a total weight of the activators in the phosphor coating is no more than about 80% of a weight of the activators in the coating if the first and second weight percents were the same.

These and other objects and advantages of the invention will be apparent to those of skill in the art of the present invention after consideration of the following drawings and description of preferred embodiments.

DESCRIPTION OF PREFERRED EMBODIMENTS

The present invention reduces the amount of rare earth activators in the phosphor coating on an alumina layer on an interior surface of a lamp by separating the phosphor coating into two phosphor layers; a top phosphor layer (nearest the source of ultraviolet radiation) that includes a normal amount of rare earth activators, and a middle phosphor layer that is between the alumina layer and the top phosphor layer and that has a reduced amount of rare earth activators. Rare earth activators preferably comprise one or more of the lanthanides (atomic nos. 57-71) and more preferably one or more of Ce, Tb, and Eu.

Figure 1:
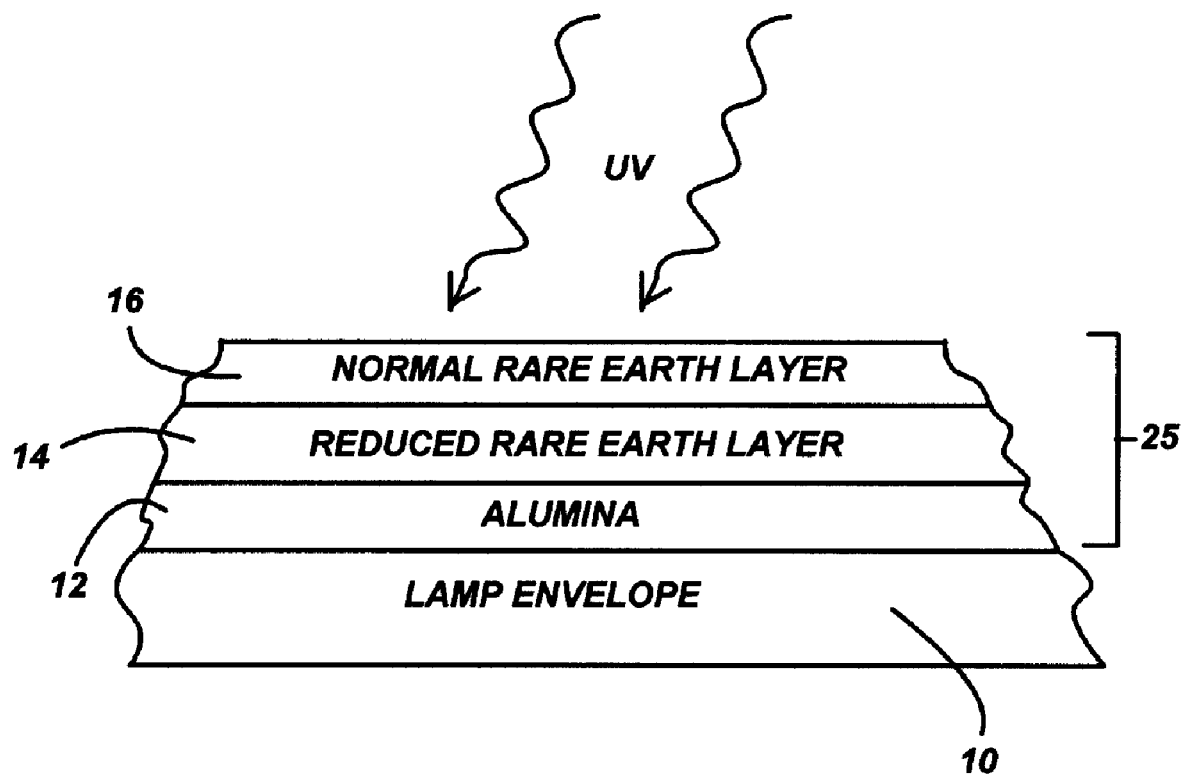
FIG. 1 is pictorial representation of a cross section of a laminate of the present invention.

FIG. 1 shows the interior surface of the lamp envelope 10 with alumina layer 12 thereon, reduced rare earth amount phosphor layer 14 on alumina layer 12, and normal rare earth amount phosphor layer 16 on phosphor layer 14. The alumina and phosphor layers 12, 14, 16 are a laminate 25 that receives the ultraviolet radiation from a UV source (typically, 254 nm radiation from a low-pressure mercury vapor discharge) and converts the radiation to visible light. The normal rare earth amount phosphor layer 16 converts most of the radiation to visible light. The alumina layer 12 reflects the ultraviolet radiation that passes through the phosphor layers 14, 16 back to the reduced rare earth amount phosphor layer 14 so that the reflected radiation is converted to visible light by the phosphor layer 14.

The primary reason this operates successfully is that a large percentage of the 254 nm ultraviolet radiation is converted to visible light by the normal rare earth amount phosphor layer 16. The exact amount of ultraviolet radiation that is converted is a function of the thickness of layer 16, activator amounts, and the phosphor particle reflectivity. The reduced rare earth amount phosphor layer 14 converts a much smaller amount of ultraviolet radiation to visible light so that the slight reduction in brightness and CRI that may result from the reduced level of rare earth activators in layer 14 does not substantially diminish the overall lamp brightness and CRI.

The phosphors and activators may be any of the above-mentioned types or other phosphors and activators suitable for lamp coatings.

The phosphor layers 14, 16 may have thicknesses that are the same or different, depending on the particular mix of phosphors and activators and their respective weights. Since the geometry of a particular envelope is known, the amounts of phosphors and activators are typically expressed as weights of the substance per lamp, rather than defining a particular thickness, i.e., total grams per lamp or coating weight.

The layers 16 and 14 preferably are comprised of substantially the same phosphors but contain different amounts of the activators. In particular, the phosphor layer 16 has a first weight percent of the rare earth activators and phosphor layer 14 has a second weight percent of the rare earth activators. The second weight percent is less than the first weight percent so that a total amount of the activators in the coating is reduced while maintaining a required lamp brightness and CRI.

Preferably the second weight percent is about 50-60% of the first weight percent and the weight of phosphor layer 14 is about 30-50% of a total weight of the layers 14 and 16 so that a total weight of the activators in the coating is no more than about 80% of a weight of the activators in the phosphor layers 14 and 16 if the first and second weight percents were the same.

Figure 4:
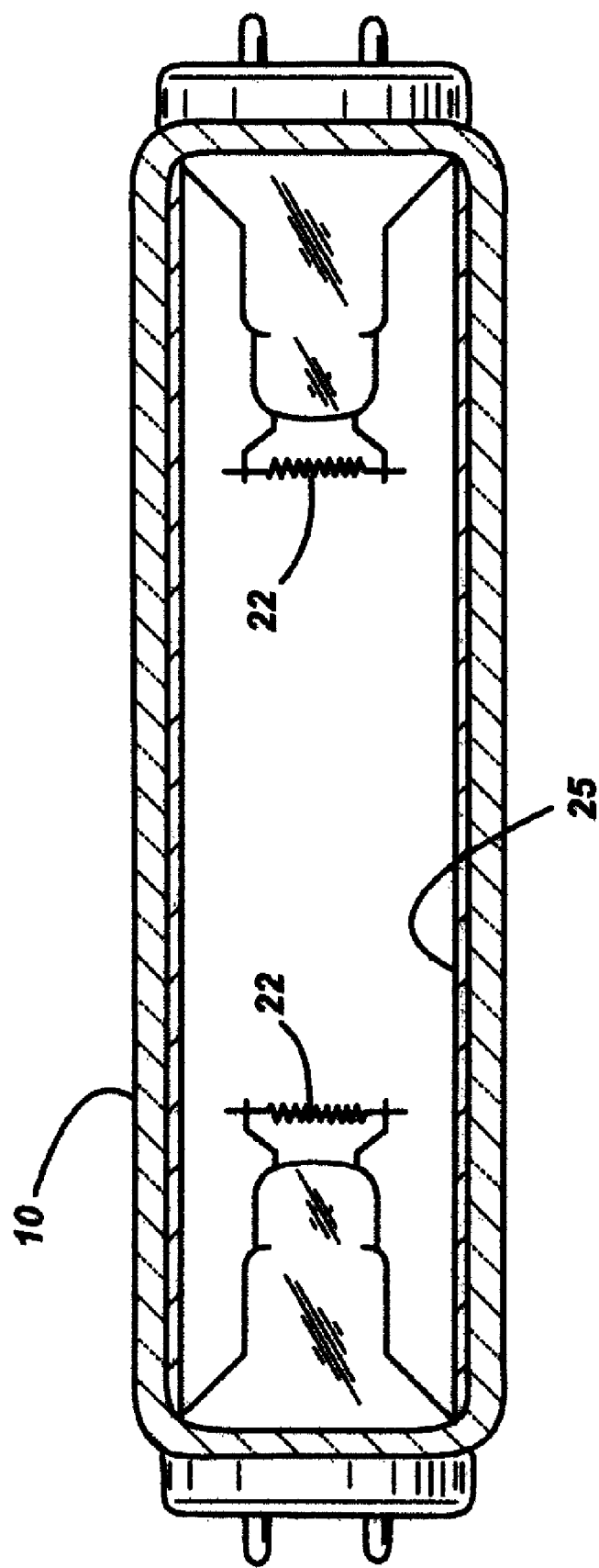
FIG. 4 is a cross sectional illustration of a fluorescent lamp having the multilayer coating according to this invention.

FIG. 4 is a cross sectional illustration of an embodiment of a fluorescent lamp having the multilayer coating of this invention. The lamp has a hermetically sealed glass envelope 10. The interior of the envelope 10 is filled with an inert gas such as argon or a mixture of argon and krypton at a low pressure, for example 1-3 torr, and a small quantity of mercury, at least enough to provide a low vapor pressure (roughly 0.008 torr at 40° C.) during operation. An electrical discharge is generated between electrodes 22 to excite the mercury vapor to generate ultraviolet radiation. Laminate 25 as described above is applied to the interior surface of the envelope 10 to convert at least a portion of the ultraviolet radiation emitted by the low-pressure mercury discharge into a desired wavelength range.

Tests were conducted on a particular embodiment to demonstrate the invention. One type of conventional fluorescent lamp (OSRAM SYLVANIA FO32T8/XP) has a tubular soda lime glass envelope, a mixed phase alumina coating (0.6 grams/lamp after lehring), a phosphor coating (YOE/LAP/BAM) on the alumina (2.1 grams/lamp after lehring), an argon gas fill at 2.5 torr, lamp electrodes with a mixed-oxide emitter coating, and a bi-pin metal base. The alumina layer contains a mixture of: (1) 95% of an alumina (CR30 from Baikowski) that is 65% alpha phase and 35% gamma phase and that has a particle size of about 100 nm; and (2) 5% of a gamma phase alumina (Aluminum Oxide C from Degussa AG) that has a particle size of about 20 nm. More information about the alumina layer is provided in U.S. Pat. No. 5,726,528 that is incorporated by reference. This lamp has a brightness at 100 hours of at least about 3000 lumens and a CRI of greater than about 83.

In a test of the application of the present invention to this lamp, the phosphor coating was replaced with a multilayer coating. Initially, the glass tube was coated with a water-based suspension of the mixed phase alumina, an organic water-soluble polymer, and water-compatible surfactants. The alumina-coated tube was then heated in a lehr to remove the organic binder in order to allow further coating applications. This coating was applied so that the weight of the alumina layer remaining in the lamp after removal of the organic materials was about 0.6 grams/lamp.

The middle layer (e.g., reduced rare earth amount phosphor layer 14) included a YOE/LAP/BAM phosphor containing about 50-60% of the normal rare earth activator levels as follows (median particle size about 6-9 microns):

YOE with Eu activator at 3.46 wt % (normally 6.55 wt %),
LAP with Tb activator at 5.2 wt % (normally 10.1 wt %), and
BAM with Eu activator at 1.07 wt % (normally 1.94 wt %).

The blend of YOE/LAP/BAM for the middle layer was adjusted to provide light with a nominal color temperature of 4100K, a CIE x color coordinate value of 0.382, and a CIE y color coordinate value of 0.384. In particular, the phosphor blend in this layer was: reduced activator YOE—59.3 wt %, reduced activator LAP—33.3 wt %, and reduced activator BAM—7.4 wt %. The reduced-activator coating was applied to the alumina coated tube. The alumina and middle layer coated tube was then heated again to permit application of the top phosphor layer.

The top phosphor layer (e.g., normal rare earth amount phosphor layer 16) was then prepared and applied. The YOE/LAP/BAM phosphors in this layer included the above-mentioned normal weight percents of activators and a SBP phosphor. The final phosphor blend in this layer was: normal activator YOE—49.0 wt %, normal activator LAP—35.3 wt %, normal activator BAM—7.4 wt %, and normal activator SBP—8.3 wt %. The total weight of the top and middle layers was 2.1 grams/lamp.

Figure 2:
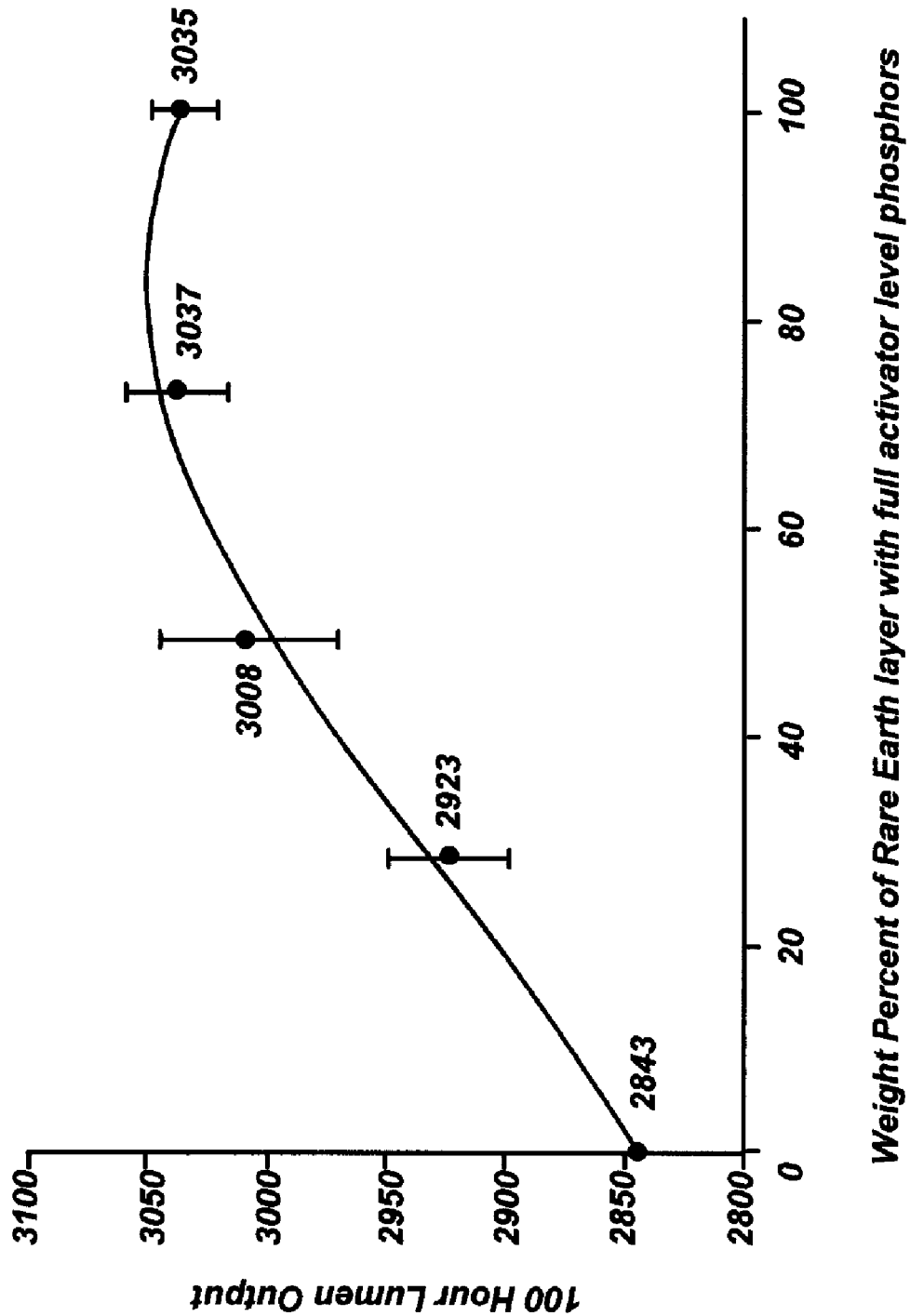
FIG. 2 is a graph showing lamp brightness as a function of a weight percent of the normal rare earth amount activator layer relative to the total coating weight.
Figure 3:
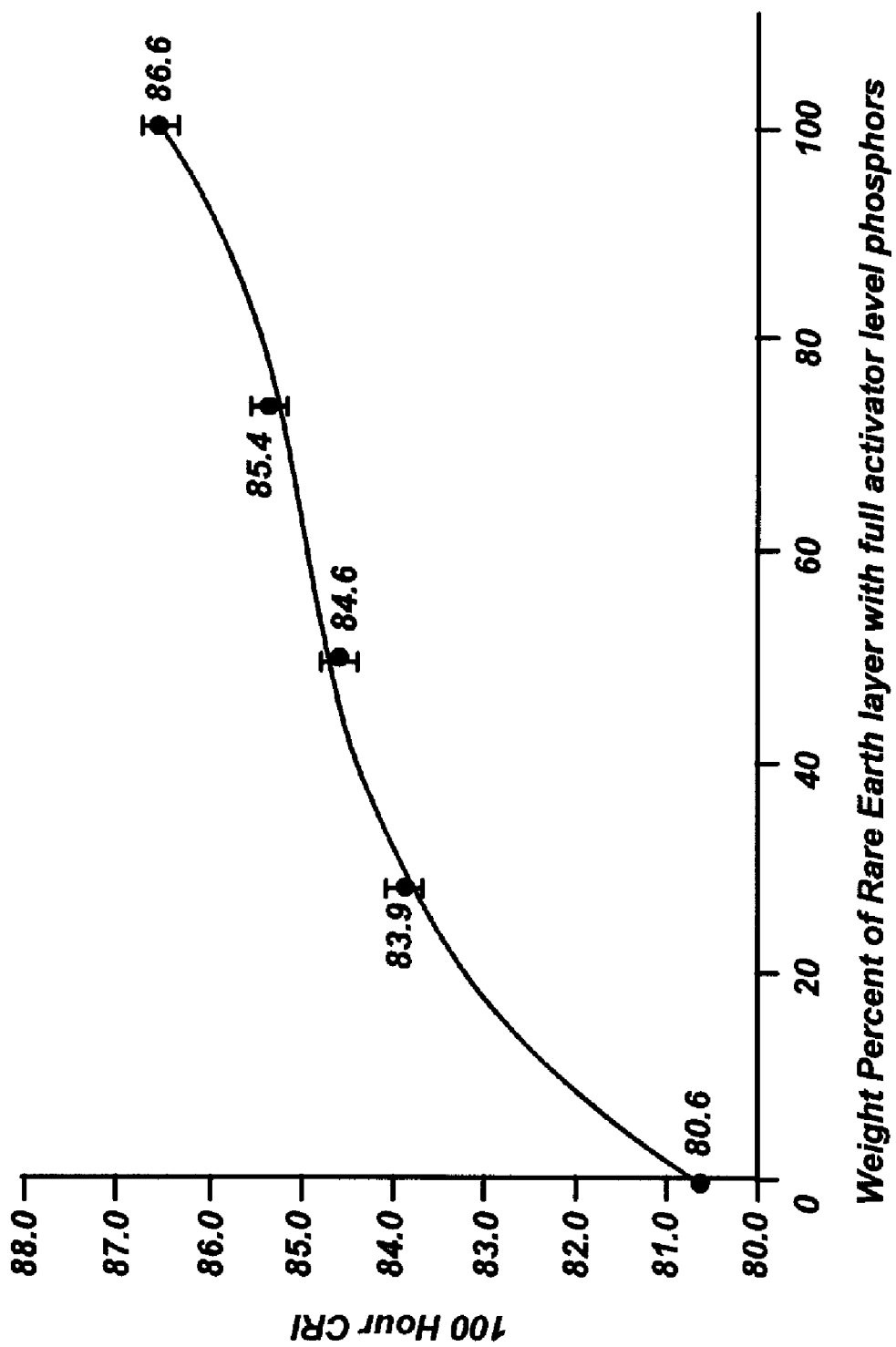
FIG. 3 is a graph showing lamp CRI as a function of a weight percent of the normal rare earth amount activator layer relative to the total coating weight.

This procedure was repeated on a set of lamps that were provided with varying amounts of the middle and top layers while keeping the total weight of the top and middle layers the same (2.1 grams/lamp in this test). The lamps were tested for brightness and CRI and the results are shown in FIGS. 2 and 3. Lamps were tested with 100% normal activator (no middle layer) and 100% reduced activator (no top layer) and with two layers where the top layer (normal activator) was about 25%, about 50% and about 75% of the total weight of the two layers (the middle layer had, respectively, about 75%, about 50% and about 25% of the total weight). As is apparent from FIG. 2, the 50% split provided the required brightness of at least 3000 lumens. FIG. 3 shows that the required CRI of greater than 83 was met when the top layer (normal activator) was as little as 25% of the total weight of the two layers. From this test it was determined that up to about 40% of the weight of a conventional, normal-activator-level phosphor layer may be replaced by the reduced-activator-level layer according to the present invention.

The percentages and phosphors given above for this test are generally representative but are not considered limiting as other percentages and phosphors are also suitable for application of the present invention in order to reduce the amount of rare earth activators in the lamp.

While embodiments of the present invention have been described in the foregoing specification and drawings, it is to be understood that the present invention is defined by the following claims when read in light of the specification and drawings.

What is claimed is:

1. A lamp comprising:
an envelope with an alumina layer on an interior surface of said envelope; and
a multilayer coating on said alumina layer,
said multilayer coating including a top layer of phosphors having a first weight percent of rare earth activators and a middle layer of phosphors having a second weight percent of said rare earth activators, said middle layer is between said alumina layer and said top layer,
and said second weight percent is greater than zero and less than said first weight percent.

2. The lamp of claim 1, wherein said second weight percent is about 50-60% of said first weight percent.

3. The lamp of claim 1, wherein said middle layer comprises 30-50% of a total weight of said top and middle layers.

4. The lamp of claim 1, wherein said top and middle layers each comprise at least one of YOE, LAP and BAM.

5. The lamp of claim 1, wherein the respective rare earth activators in said top and middle layers comprise at least one of europium, terbium and cerium.

6. The lamp of claim 1, wherein said top and middle layers each comprise YOE, LAP and BAM.

7. The lamp of claim 1 wherein the lamp has a brightness at 100 hours of at least about 3000 lumens.

8. The lamp of claim 1 wherein the lamp has a CRI of greater than about 83.

9. The lamp of claim 7 wherein the lamp has a CRI of greater than about 83.

10. A lamp comprising:
an envelope with an alumina layer on an interior surface of said envelope; and
a multilayer coating on said alumina layer,
said multilayer coating including a top layer of phosphors having a first non-zero weight percent of rare earth activators, and a middle layer of phosphors having a second non-zero weight percent of said rare earth activators, said middle layer being between said alumina layer and said top layer, and
wherein said second non-zero weight percent is less than said first non-zero weight percent so that a total weight of said rare earth activators in said top and middle layers is no more than about 80% of a total weight of said rare earth activators in said top and middle layers if said first and second non-zero weight percents were the same.

11. The lamp of claim 10, wherein said second non-zero weight percent is about 50-60% of the first non-zero weight percent.

12. The lamp of claim 10, wherein said middle layer comprises 30-50% of a total weight of said top and middle layers.

13. The lamp of claim 10, wherein said top and middle layers each comprise at least one of YOE, LAP and BAM.

14. The lamp of claim 10, wherein said rare earth activators in said top and middle layers comprise at least one of europium, terbium and cerium.

15. A fluorescent lamp comprising:
a glass envelope with an alumina layer on an interior surface of said envelope;
a multilayer coating on said alumina layer, said multilayer coating including a top layer and a middle layer, said middle layer being between said alumina layer and said top layer;
said top layer comprising a first blend of YOE, LAP and BAM phosphors, said first blend having a first weight percent of Ce, Tb and Eu activators;
said middle layer comprising a second blend of YOE, LAP and BAM phosphors, said second blend having a second weight percent of the Ce, Tb and Eu activators; and
said second weight percent is greater than zero and less than said first weight percent.

16. The lamp of claim 15, wherein said middle layer comprises 30-50% of a total weight of said top and middle layers.

17. The lamp of claim 15 wherein said first blend comprises by weight 49% YOE, 35.3% LAP, 7.4% BAM and 8.3% SBP, said YOE, LAP, and BAM phosphors in said first blend contain 6.55 weight percent Eu, 10.1 weight percent Tb, and 1.94 weight percent Eu, respectively; and
said second blend comprises by weight 59.3% YOE, 33.3% LAP, and 7.4% BAM, said YOE, LAP, and BAM phosphors in said second blend contain 3.46 weight percent Eu, 5.2 weight percent Tb, and 1.07 weight percent Eu, respectively.

18. The lamp of claim 17 wherein the lamp has a brightness at 100 hours of at least about 3000 lumens and a CRI of greater than about 83.

19. The lamp of claim 15 wherein said second weight percent is about 50-60% of said first weight percent.

* * * * *